(12) United States Patent
Bhattacharya et al.

(10) Patent No.: US 9,430,534 B2
(45) Date of Patent: Aug. 30, 2016

(54) SYSTEMS AND METHODS FOR IMPROVED SECURITY AND PRECISION IN EXECUTING ANALYTICS USING SDKS

(71) Applicants: Sourav S. Bhattacharya, Fountain Hills, AZ (US); Anirban Bhattacharya, Bangalore (IN); Kuldip Shetty, Sastan (IN); Krishna Prasad Muraleedharan Pillai, Kirkland, WA (US); Ravi Udaya Kumble, Bangalore (IN); Venu Aluri, Gudlavalleru (IN); Vitesh Patel, Bangalore (IN)

(72) Inventors: Sourav S. Bhattacharya, Fountain Hills, AZ (US); Anirban Bhattacharya, Bangalore (IN); Kuldip Shetty, Sastan (IN); Krishna Prasad Muraleedharan Pillai, Kirkland, WA (US); Ravi Udaya Kumble, Bangalore (IN); Venu Aluri, Gudlavalleru (IN); Vitesh Patel, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 323 days.

(21) Appl. No.: 13/971,761

(22) Filed: Aug. 20, 2013

(65) Prior Publication Data
US 2014/0337268 A1    Nov. 13, 2014

(30) Foreign Application Priority Data
May 9, 2013   (IN) .......................... 2072/CHE/2013

(51) Int. Cl.
G06F 21/00    (2013.01)
G06F 17/30    (2006.01)
G06Q 10/00    (2012.01)
G06Q 10/06    (2012.01)

(52) U.S. Cl.
CPC ......... *G06F 17/30542* (2013.01); *G06F 21/00* (2013.01); *G06Q 10/00* (2013.01); *G06Q 10/0637* (2013.01)

(58) Field of Classification Search
CPC ...................................................... G06F 15/16
See application file for complete search history.

(56) References Cited

U.S. PATENT DOCUMENTS

| | | | |
|---|---|---|---|
| 5,388,259 | A  | 2/1995  | Fleischman et al. |
| 6,668,325 | B1 | 12/2003 | Collberg et al. |
| 6,778,946 | B1 | 8/2004  | Chang et al. |
| 7,237,232 | B2 | 6/2007  | Smith |
| 8,073,869 | B2 | 12/2011 | Li et al. |

(Continued)

OTHER PUBLICATIONS

Apache CXF, "Debugging and Logging," http://cxf.apache.org/docs/debugging-and-logging.html (Sep. 11, 2009).

(Continued)

*Primary Examiner* — Stanley K Hill
*Assistant Examiner* — Ola Olude Afolabi
(74) *Attorney, Agent, or Firm* — Finnegan, Henderson, Farabow, Garrett & Dunner, L.L.P.

(57) ABSTRACT

This disclosure generally relates to computer-implemented analytics, and more particularly to systems and methods for improved security and precision in executing analytics using SDKs. In one embodiment, an analytics system is disclosed, comprising: a processor; and a memory device operatively connected to the processor and storing processor-executable instructions for: receiving an application programming interface (API) call for a service; parsing the API call to extract an API call name and one or more API call parameters; generating prediction values for one or more interpreted-data parameters; obtaining one or more analytics rules; performing an analytics operation to generate an analytics result according to the one or more analytics rules based on the generated prediction values for the one or more interpreted-data parameters and the extracted one or more API call parameters; and generating a visual representation of the analytics result.

42 Claims, 10 Drawing Sheets

(56) References Cited

U.S. PATENT DOCUMENTS

| | | | |
|---|---|---|---|
| 2008/0033810 | A1 | 2/2008 | Chu |
| 2012/0215829 | A1* | 8/2012 | Naphade .............. G06N 99/005 709/203 |
| 2013/0070644 | A1 | 3/2013 | McCann et al. |
| 2013/0151453 | A1* | 6/2013 | Bhanot .................... G06N 5/02 706/46 |

OTHER PUBLICATIONS

Axiologic Research SRL, "C/C++ Obfuscators," http://www.obfuscator.info/c_cpp_obfuscators.html (Oct. 31, 2007).

Aziz, A., "Tracing—Logging—Monitoring," http://sharptoolbox.com/categories/tracing-logging-monitoring (Jan. 13, 2005).

Chan, J-T. et al., "Advanced Obfuscation Techniques for Java Bytecode," The Journal of System and Software, 71, pp. 1-10 (2004).

Codeguru, "What is Obfuscation?," http://forums.codeguru.com/showthread.php?375616-.NET-Framework-IL-What-is-Obfuscation (Feb. 13, 2006).

Dmoz Open Directory Project, "Obfuscation and Ecryption," http://www.dmoz.org/Computers/Programming/Languages/PHP/Development_Tools/Obfuscation_and_Encryption/ (Aug. 4, 2010).

Google Analytics, "Analyze Your Data," https://support.google.com/analytics/ (2013).

IBM, "Logging with the Java Persistence API (JPA) and the application server," http://pic.dhe.ibm.com/infocenter/wasinfo/v6r1/index.jsp?topic=%2Fcom.ibm.websphere.ejbfep.multiplatform.doc%2Finfo%2Fae%2Fae%2Ftejb_loggingwjpa.html (Jul. 3, 2013).

Johnstone, C., "Microsoft Lync 2010 Client Logging," http://blog.insidelync.com/2011/10/microsoft-lync-2010-client-logging/ (Oct. 24, 2011).

Microsoft, "Using the Windows Deployment Services Client API," http://msdn.microsoft.com/en-us/library/windows/desktop/bb530731%28v=vs.85%29.aspx (Jun. 12, 2013).

Paul, J., "Top 10 tips on logging in Java," http://javarevisited.blogspot.com/2011/05/top-10-tips-on-logging-in-java.html (May 2, 2011).

Remotesoft, Inc., "Salamander .NET Obfuscator," http://www.remotesoft.com/salamander/obfuscator.html (2011).

Google Developers, "Downloads—Android SDK," https://developers.google.com/analytics/devguides/collection/android/resources (May 28, 2012).

Guard, D., "Introducing CSharpAnalytics—C# SDK for Google Analytics," http://attackpattern.com/2013/01/csharpanalytics-csharp-sdk-for-google-analytics/ (Jan. 14, 2013).

Google Developers, "iOS Native Application Tracking Overview," https://developers.google.com/analytics/devguides/collection/ios/ (Aug. 16, 2013).

Apigee, "Mobile Analytics FAQ," http://apigee.com/docs/app-services/content/mobile-analytics-faq (2013).

Zeis, A., "BlackBerry Analytics Service SDK now available to developers," http://crackberry.com/blackberry-analytics-service-sdk-now-available-developers (Feb. 28, 2011).

Codeplex, "Bango BlackBerry Application Analytics SDK," http://bangoblackberrysdk.codeplex.com/ (Dec. 8, 2011).

BMC Software, "Middleware Management," http://www.bmc.com/products/product-listing/bmc-middleware-management.html?intcmp=redirect_middleware (2005).

VB Profiles, "Agora Games," http://venturebeatprofiles.com/company/profile/agora-games/ (2013).

Kontagent, "Dissect Data, Diagnose Desire," http://www.kontagent.com/products/ (2013).

* cited by examiner

SYSTEMS AND METHODS FOR IMPROVED SECURITY AND PRECISION IN EXECUTING ANALYTICS USING SDKS

PRIORITY CLAIM

This disclosure claims priority under 35 U.S.C. §119 to: India Application No. 2072/CHE/2013, filed May 9, 2013, and entitled "Systems and Methods for Improved Security in Executing Analytics using SDKs." The aforementioned application is incorporated herein by reference in its entirety.

TECHNICAL FIELD

This disclosure generally relates to computer-implemented analytics, and more particularly to systems and methods for improved security and precision in executing analytics using SDKs.

BACKGROUND

Analytics is the discovery and communication of meaningful patterns in data. Firms may commonly apply analytics to business data to describe, predict, and improve business performance, and a person in an organization may execute analytics queries and obtain relevant data to facilitate decision making. For example, a requester in a department store may execute an analytics query related to profitability analysis of that facility. The confidentiality of analytics queries can avoid leakage of trade secrets and sensitive information related to business decisions. For example, in the scenario above, access to the analytics query may allow internal developers and third parties to predict that the organization may be considering the closing of a store.

Further, analytics queries may include two types of data: certain data and uncertain data. A query causes a company data system to retrieve outputs, and display them to the requester. In most queries, some data will be certain, such as total sales for the previous calendar year, and other data will be uncertain, such as total sales for the next calendar year. Typically, analytics queries do not take into account or process the uncertain data. Further, there is ambiguity in the interpretation of analytics outputs. For example, an analytics query for "electronic chip P123", may reasonably be interpreted as concerning: i) which devices use the P123 electronic chip or ii) future sales predictions of the P123 electronic chip. Thus, the output of such a query may be ambiguous. Also, the analytics outputs associated with different business scenarios are not generally considered or provided.

SUMMARY

In one embodiment, an analytics system is disclosed, comprising: a processor; and a memory device operatively connected to the processor and storing processor-executable instructions for: receiving an application programming interface (API) call for a service; parsing the API call to extract an API call name and one or more API call parameters; generating prediction values for one or more interpreted-data parameters; obtaining one or more analytics rules; performing an analytics operation to generate an analytics result according to the one or more analytics rules based on at least the generated prediction values for the one or more interpreted-data parameters and the extracted one or more API call parameters; and generating a visual representation of the analytics result.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for executing analytics queries to obtain analytics results are disclosed. Consistent with disclosed embodiments, an analytics system may process Application Programming Interface (API) calls for each analytics instruction. The API calls may be parsed into (i) an API call name, and (ii) API call parameters. In some embodiments, while the API call name may be unrelated to analytics, the API call parameters may be related to analytics. A requester of analytics may query to obtain analytics results using the analytics system to facilitate decision making.

When an analytics query is executed, keywords from the analytics query may be mapped with source data stored in a database to identify a context. In one implementation, the database may include a list of parameters related to the data, and the analytics query may be an SQL query upon the data to generate a view. More complex analytics queries may be utilized, including, for example: (a) contextual data mapping and (b) predictive data interpretation. An example contextual data mapping may be in the blacklisted word filtering for SMS (telecom application) text, where the specific words that are blacklisted may widely different amongst client applications. For example, a church or religious body may disapprove the use of certain keywords by their employees and patron SMS texts, but the same words may be considered perfectly appropriate to use among a set of entertainment industry executives. An illustration of predictive data interpretation is provided below in this disclosure with reference to the example of predictive interpretation of data with a part no P1234. When these data parameters are interpreted based on the context, interpreted data parameters may be obtained. Data parameters that are stored in the database as corresponding to the context identified from the analytics query may be interpreted data parameters for that context. Prediction values may be hypothetical, predicted percentage values that may be assigned to each of the interpreted data parameters. Based on the prediction values that may be assigned to the interpreted data parameters, analytics results can be obtained.

Figure 1A:
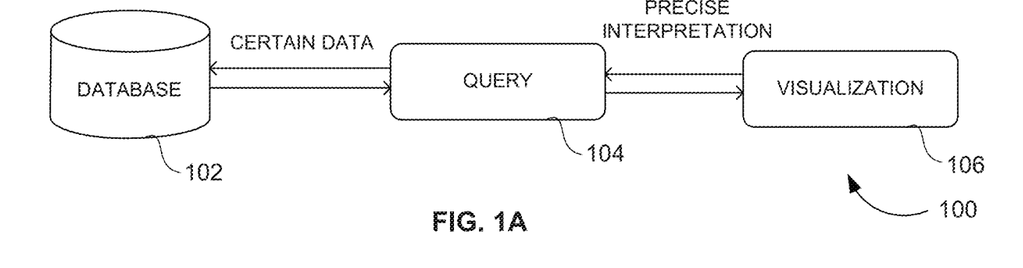
FIG. 1A is a block diagram illustrating some aspects of execution of analytics queries.

FIG. 1A is a block diagram illustrating the execution of analytics queries using a baseline configuration 100 which may include a database 102 with source data, a query module 104, and a visualization end unit 106. A requester may execute an analytics query in the query module 104, and analytics outputs that correspond to the analytics query may then be obtained from the database 102. Uncertain data in the analytics queries may be not processed, and therefore the analytics outputs may not be helpful to the requester.

Some analytics may include both uncertain data and partially certain data, and such queries are typically termed "fuzzy" queries. A conventional execution strategy may mask uncertain data, so that only certain data may be executed. Without including the uncertain data, however, the analytics outputs may be limited in their relevance. In another conventional approach, fuzzy queries with both uncertain and certain data may be executed with a customized margin of error. Here, however, the outputs may associate particular data with different business scenarios. Without such references, the outputs may provide little support for rational decisions.

Figure 1B:
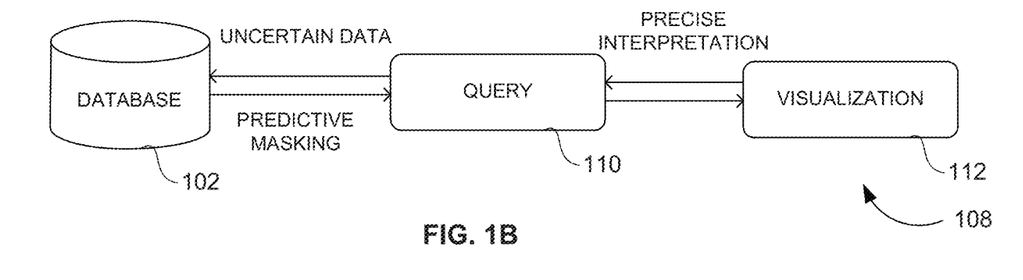
FIG. 1B is a block diagram further illustrating additional aspects of execution of analytics queries.

FIG. 1B illustrates the execution of analytics queries using a fuzzy query configuration 108 that may include visualization of data by executing a fuzzy query with uncertain source data. The fuzzy query configuration 108 may include the database 102 of FIG. 1A with source data, a query module 110, and a visualization end unit 112. A requester may execute the fuzzy query in the query module 110, and analytics outputs that correspond to the fuzzy query may be obtained from the database 102. The fuzzy query may include uncertain data that may be masked, and only certain data of the fuzzy query may be executed to obtain the analytics output. Hence, the analytics outputs that may be obtained from the database 102 may be only partially correct.

Figure 2:
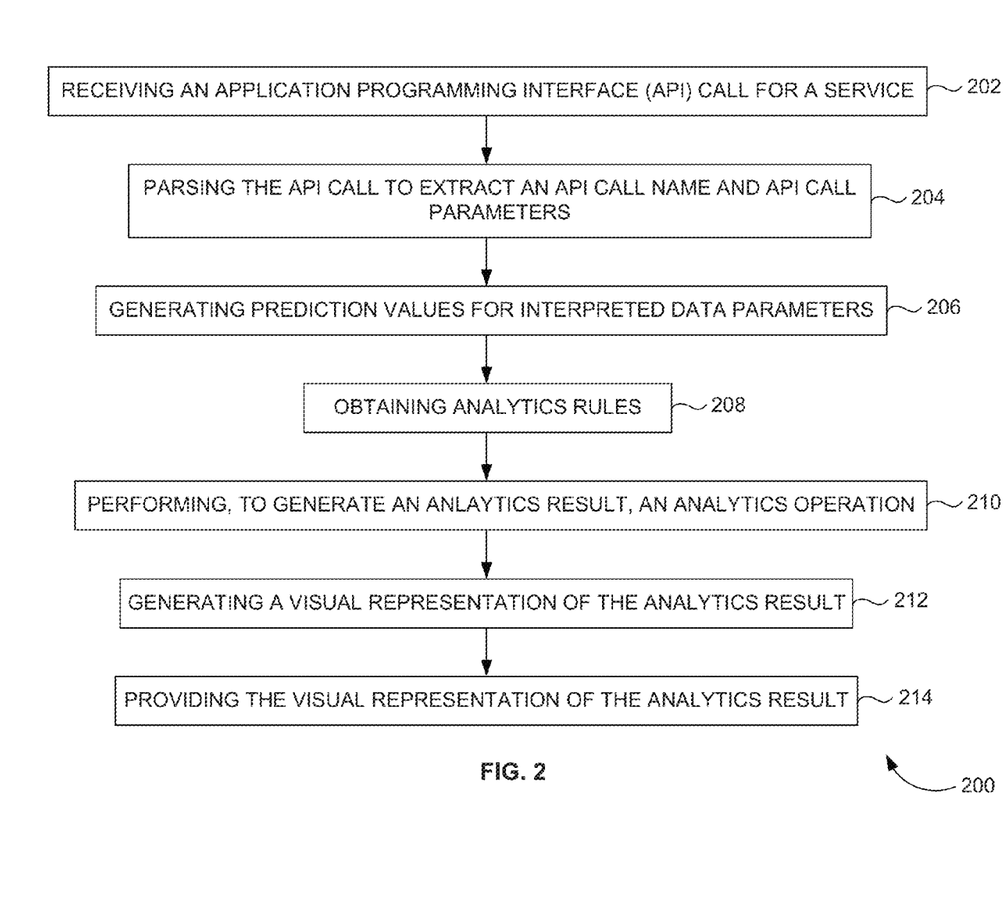
FIG. 2 is a flow diagram illustrating a method of providing a visual representation of an analytics result for an analytics query according to some embodiments of the present disclosure.

FIG. 2 is a flow diagram 200 illustrating a method of providing a visual representation of an analytics result for an analytics query according to one embodiment of the present disclosure. In step 202, an application programming interface (API) call may be received for a service based on the analytics query from a requester. In some embodiments, the service may be a web application service. In step 204, the API call may be parsed to extract an API call name and API call parameters.

In step 206, prediction values may be generated for interpreted data parameters. The interpreted data parameters may be obtained from a database that may include data, and data parameters, stored based on a context that may be identified from keywords in the analytics query. The interpreted data parameters may also be obtained from a domain expert, e.g., a financial analyst or expert who has insights into the market trends of the company profits in a specific industry sector. A prediction value may be generated for each interpreted data parameter, as will become clearer from the example discussed below. In some embodiments, the domain expert may parameterize each uncertainty factor in the prediction process and implement a permutation-combination of the said uncertainty factors to evaluate all-possible "what-IF" scenarios. The prediction value may be generated based on a user input or selected from a predetermined value that may be stored in a database. In step 208, analytics rules may be obtained from an SDK server. In step 210, an analytics operation may be performed to generate the analytics result according to the analytics rules based on the generated prediction values for the interpreted data parameters and the extracted API call parameters. In step 212, a visual representation of the analytics result may be generated. In step 214, the visual representation of the analytics result may be provided to the requester.

A user input requesting iterations in the prediction values for the interpreted data parameters may be obtained when certain criteria of the requester have not been met. New prediction values may be generated by updating previously generated prediction values for the interpreted data parameters.

Figure 3:
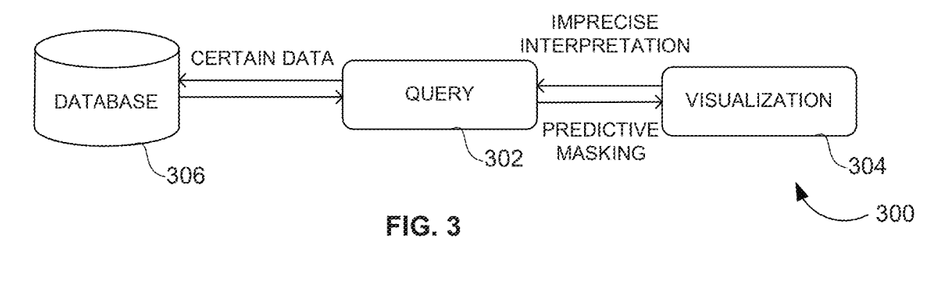
FIG. 3 is a block diagram illustrating the execution of analytics according to some embodiments of the present disclosure.

FIG. 3 is a block diagram illustrating the execution of analytics queries using an imprecise visualization configuration 300 that may include a query module 302, a visualization end unit 304, and a database 306 with source data according to one embodiment of the present disclosure. In the imprecise visualization configuration 300, imprecise analytics may be performed. Analytics queries that may be executed by a requester, and interpreted data parameters that correspond to the analytics queries, may both be certain. The requester may execute an analytics query using the analytics query module 302. Keywords from the analytics query may be mapped with the source data stored in the database 306 to identify a context. Prediction values may be hypothetical predicted percentage values that may be assigned to each of the interpreted data parameters. The interpreted data parameters may be obtained from the database 306. Analytics results may be generated based on a prediction value for each interpreted data parameter.

For example, the requester may execute an analytics query which discloses an electronic part 'P1234'. A context associated with executing the analytics query may include a 'prediction of future sales volume of the electronic part P1234'. The context may be identified by mapping the keyword 'P1234' with source data stored in the database 306. Based on the identified context 'prediction of future sales volume of the electronic part P1234, data parameters may be interpreted to obtain interpreted data parameters stored in the database 306 that may be relevant to the context. Such interpreted data parameters may include (i) devices that use the electronic part 'P1234', (ii) the number of production units that manufacture part 'P1234', and (iii)

the number of local stores that sell the electronic part 'P1234'. The devices may include, for example, a tablet, a phone, and a 2-way radio system.

With the interpreted data parameters, a prediction value may be generated for each interpreted data parameters. The prediction value may be generated by a user input and/or selected from predetermined values stored in the database 306.

For example, the requester can predict analytics results when prediction values of three interpreted data parameters may be 33% each, 40%, 40%, and 20%, respectively, or 90%, 5%, and 5%, respectively. As described, the prediction values may be obtained as a user input. For example, the requester may input the prediction values for the interpreted data parameters as 33% each, and analytics results may be generated accordingly. The prediction values for the interpreted data parameters may be obtained from one or more predetermined values. For example, the database 306 may store a predetermined value of 40%, 40%, and 20% for the interpreted data parameters, and the predetermined values may be used for analytics.

The interpreted-data parameters may be selected via user input. For instance, for the analytics query which discloses the electronic part 'P1234', the requester may select "devices that use the electronic part 'P1234'" and "the number of production units that manufacture part 'P1234'" as interpreted-data parameters from a list of predicted interpreted-data parameters, and not "the number of local stores that sell the electronic part 'P1234'". The user input may be obtained after determining that the user input is required for generating prediction values for the interpreted data parameters.

Generating prediction values for a subset of the interpreted data parameters may be dependent on prediction values for another subset of interpreted data parameters. For example, when an analytics query which discloses the electronic part 'P1234' is executed, a first subset of the interpreted data parameters and a second subset of interpreted data parameters may be obtained. The first subset of the interpreted data parameters may include a) "devices that use the electronic part 'P1234'", and b) "the number of production units that manufacture part 'P1234'". The second subset of interpreted data parameters may include "the number of local stores that sell the electronic part 'P1234'". The prediction value of devices that use the electronic part 'P1234'" may be 30%, and "the number of production units that manufacture part 'P1234'" may be 20%. The prediction value of "the number of local stores that sell the electronic part 'P1234'" may be 50%.

Figure 4:
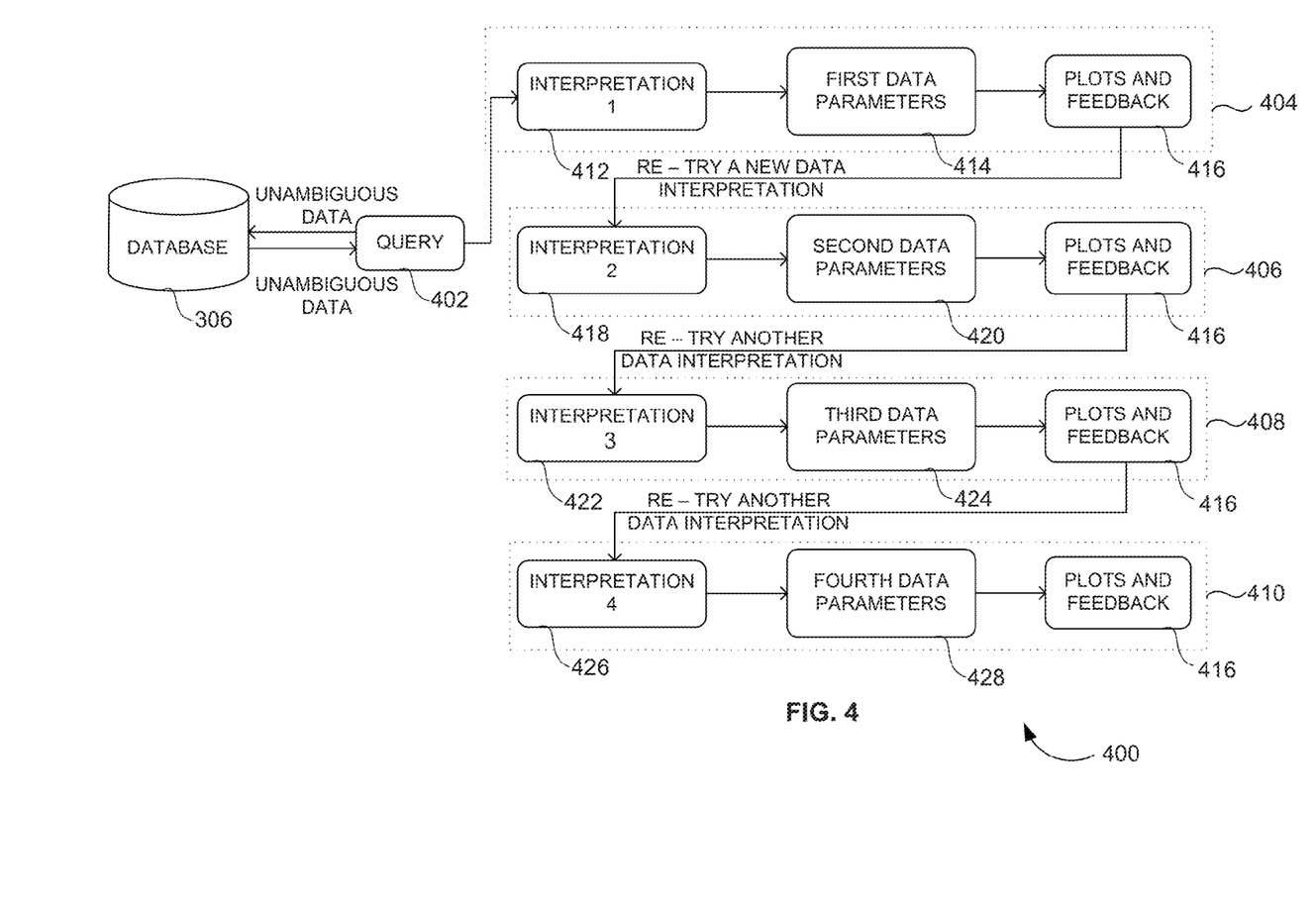
FIG. 4 is a flow diagram that illustrates an iterative looping of the imprecise visualization configuration of FIG. 3 according to some embodiments of the present disclosure.

FIG. 4 is a flow diagram 400 that illustrates an iterative looping of the imprecise visualization configuration 300 of FIG. 3 until an analytics result meets criteria of a requester system and/or user according to one embodiment of the present disclosure. The requester may execute an analytics query 402 in the query module 302 of FIG. 3. The imprecise visualization configuration 300 may allow the requester to iteratively obtain analytics data sets until the criteria of the requester have been met. The flow diagram 400 may include a first analytics data set 404, a second analytics data set 406, a third analytics data set 408, and a fourth analytics data set 410.

The first analytics data set 404 may include a first interpretation 412 that may include first interpreted data parameters 414, and a plots and feedback field 416. Similarly, the second analytics data set 406 may include a second interpretation 418 that may include second interpreted data parameters 420, and the plots and feedback field 416. The third analytics data set 408 may include a third interpretation 422 that may include third interpreted data parameters 424, and the plots and feedback field 416. The fourth analytics data set 410 may include a fourth interpretation 426 that may include fourth interpretation data parameters 428, and the plots and feedback field 416. When the requester executes the analytics query 402 in the query module 302, the first interpreted data parameters 414 may be obtained from the database 306.

As described above, each interpreted data parameter of the first interpreted data parameters 414 may be assigned a prediction value to obtain analytics results associated with the first analytics data set 404. When the first analytics data set 404 has not met certain criteria of a requester, the imprecise visualization configuration 300 enables the requester to obtain the second analytics data set 406. The requester may input prediction values for the second interpreted data parameters 420 by updating the prediction values of the first interpreted data parameters 414. Similarly, the imprecise visualization configuration 300 allows the requester to obtain further analytics data sets until the criteria have been met. Using the plots and feedback field 416, the requester can provide feedback on the analytics results, and such feedback may be stored in the database 306.

Figure 5:
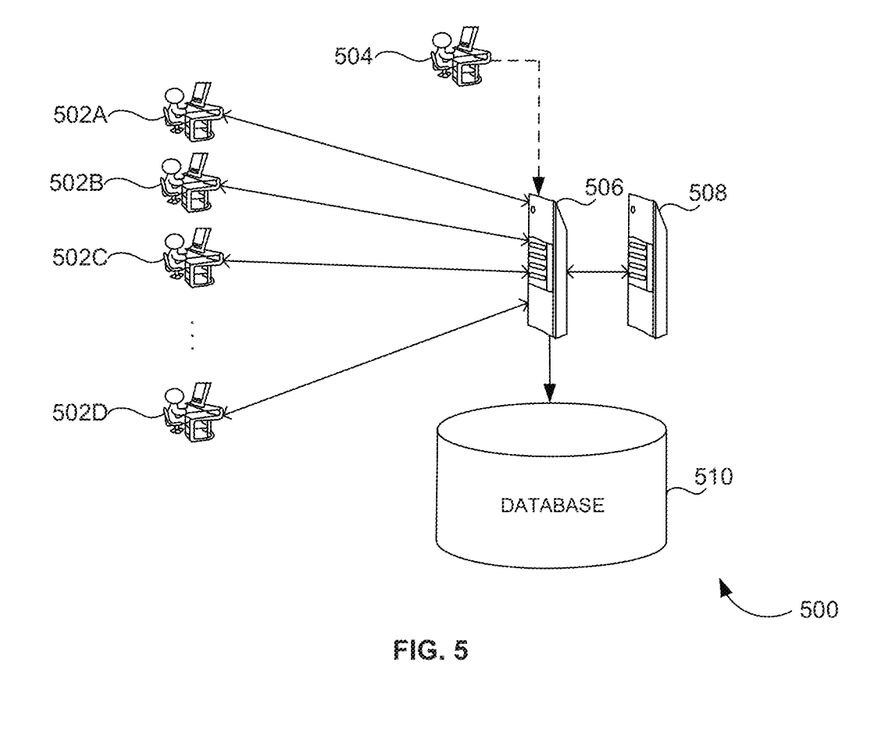
FIG. 5 is a schematic representation of an analytics system according to some embodiments of the present disclosure.

FIG. 5 is a schematic representation of an analytics system 500 that may include developers 502A-D and a requester 504 communicating with an SDK server 506 according to one embodiment of the present disclosure. The analytics system 500 further may include a backplane service provider 508, and a database 510. The developers 502A-D may provide API calls for each analytic instruction. The requester 504 may execute analytics queries with improved security using the analytics system 500.

Analytics queries may be detached from the developers 502A-D, a user device providing API calls, and third-party external analytics engines or providers may be implemented in the SDK server 506. The API calls may be forwarded to the backplane service provider 508. The database 510 stores analytics results and dashboards for the one or more analytics queries. The analytics results and the dashboards may be displayed to the requester 504. The SDK server 506 may be implemented at a middleware location. The analytics system 500 may be rapidly developed, deployed, and implemented in the middleware location based on (i) an IP re-routing model, and/or (ii) a Lexical re-routing model.

Figure 6:
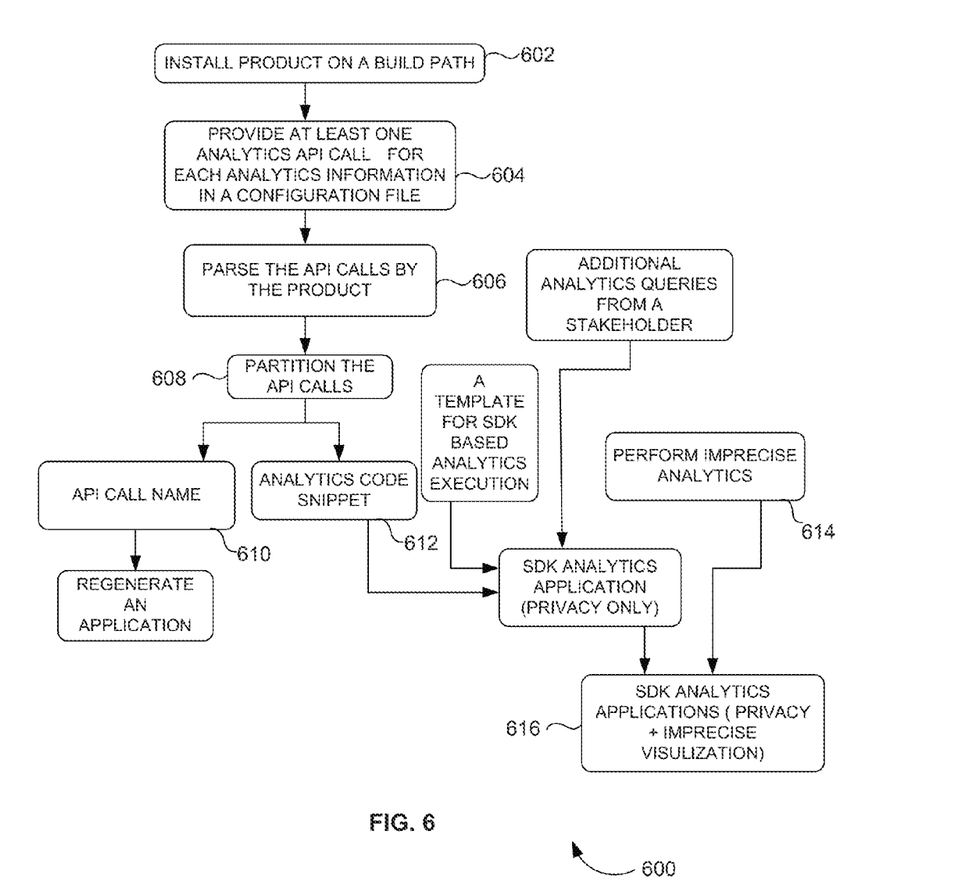
FIG. 6 is a flow diagram that illustrates a method for implementing the SDK server according to some embodiments of the present disclosure.

FIG. 6 is a flow diagram 600 that illustrates a method for implementing the SDK server 506 of the analytics system 500 of FIG. 5 at a middleware location according to one embodiment of the present disclosure. In this example, the flow diagram 600 provides an implementation method for a telecommunication provider. However, the analytics system 500 may be implemented in any API based application development platform. In step 602, the developers 502A-D install a product on a server in which a source code may be processed. In step 604, the developers 502A-D provide at least one analytics API call to SDK server 506 for each analytics instruction in a configuration file.

In step 606, the product parses the API calls for each analytics instruction. In step 608, the API calls may be partitioned into API call parameters that may be related to analytics (analytics code snippet), and an API call name that may be unrelated to analytics. The API call name that may be unrelated to analytics may include a developer's application business logic. The API call parameters that may be related to analytics may be executed at the SDK server 506 by the requester 504. Similarly, API call parameters that may be related to analytics may be executed as a separated code at the SDK server 506. The API call parameters that may be related to analytics may be not revealed to the developers 502A-D or to third-parties who execute analytics queries. In step 610, the API call name that is unrelated to analytics may be provided to an external web service provider for regenerating an application.

The analytics code snippet may further include a template (e.g., a code header and build environment) for SDK based analytics execution, and one or more additional analytics queries and instructions that the requester 504 may desire to execute. In step 612, the analytics code snippet may be executed at the SDK server 506. In step 614, imprecise analytics such as the imprecise visualization configuration 300 may be performed. In step 616, the SDK server 506 at the middleware location may be used to secure execution of the analytics queries and to generate analytics results in addition to executing analytics such as an imprecise visualization. The analytics results may be generated based on analytics rules based on prediction values obtained from the imprecise analytics for interpreted data parameters and the API call parameters that may be related to analytics. The analytics rules may be stored in the database 510, or in the SDK server 506, and may be inaccessible to the developers 502A-D, a user device providing API calls, and third-party external analytics engines or providers. Analytics rules may include prediction values that may be generated for the interpreted data parameters. The API calls may include identifications of the analytics rules.

When the requester 504 executes a new analytics query in addition to the previously executed analytics query, a new API call name or a new API call address may be generated using i) the API call name and/or ii) the API call parameters that may be obtained by parsing an API call associated with the previously executed analytics query. Further, a new API call may be generated for a service using i) the generated new API call name and/or ii) the generated new API call address.

The new API call name may be generated by extracting a string subset of the API call name associated with execution of the previously executed analytics query. An API call address for the new API call name and an API call address for the API call that is received for the service may be the same. The new API call address may be generated by providing the API call name as an input to a lookup table. The API call name for the new API call may be the same as the API call name associated with the previously executed analytics query.

The SDK server 506 may be implemented at the middleware location based on i) an IP Re-Routing model and/or ii) a Lexical Re-Routing model (Dynamic-link library model a/k/a DLL model). In the IP Re-Rerouting model, the API calls may be re-routed to a local application server (e.g., the SDK server 506). The API calls may be parsed and partitioned into API call parameters that may be related to analytics, and an API call name that is unrelated to analytics, at the local application server. The API call parameters that may be related to analytics may be executed at the local application server and may be not revealed to the developers 502A-D. The API call name that is unrelated to analytics may be forwarded to and processed at the backplane service provider 508. In the Lexical Re-Routing model, the API calls may be lexically renamed to a minor variant library name and executed at the Dynamic-Link Library (DLL). The API call name that is unrelated to analytics may be forwarded to and processed at the backplane service provider 508.

Figure 7:
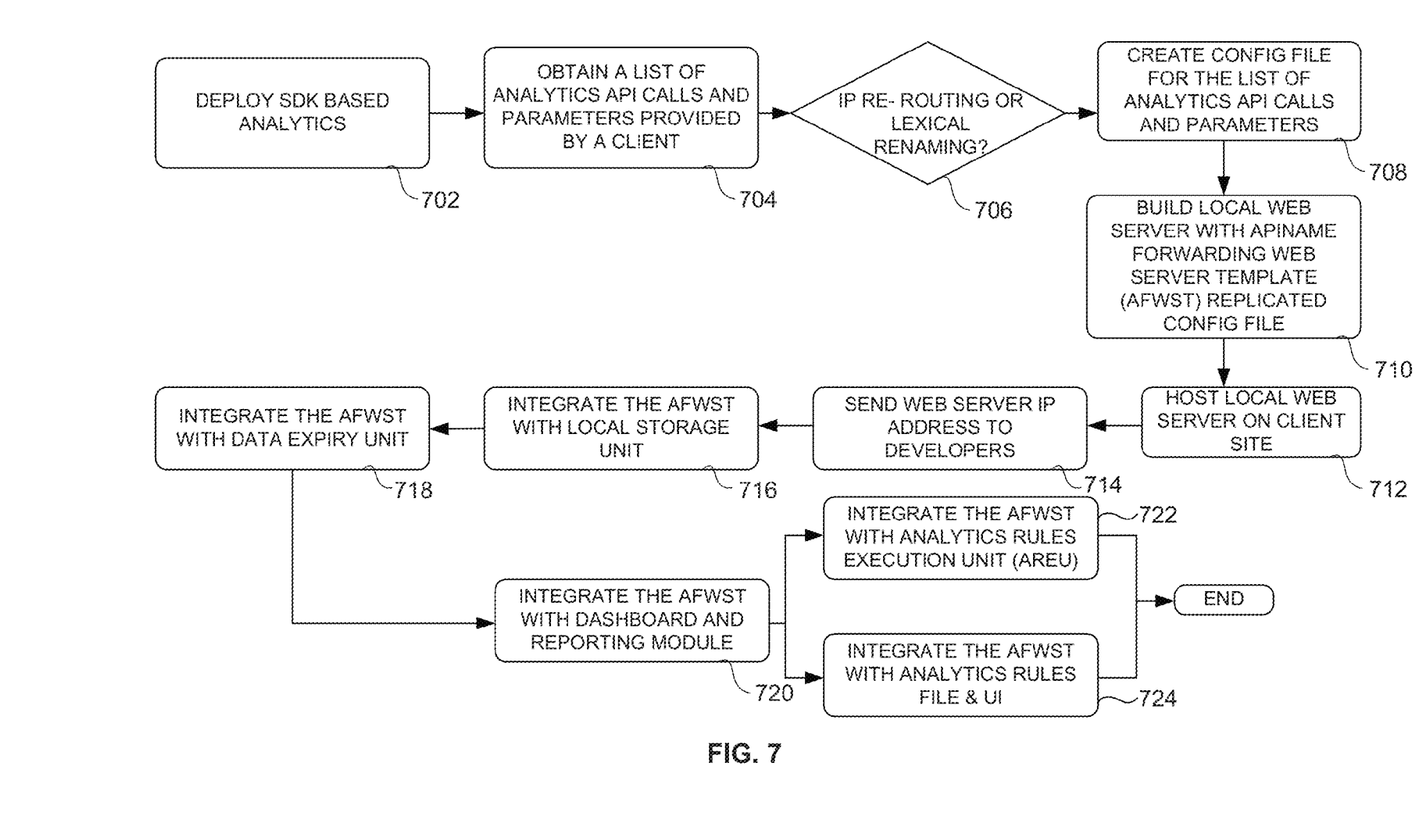
FIG. 7 is a flow diagram that illustrates a method for obtaining analytics results according to some embodiments of the present disclosure.

FIG. 7 is a flow diagram that illustrates a method for obtaining analytics results using the SDK server 506 of the analytics system 500 implemented at a middleware location based on an IP Re-Routing model according to one embodiment of the present disclosure. In step 702, SDK based analytics may be deployed. In step 704, a list of analytics API calls and parameters may be obtained from a client for analytics information. In step 706, the SDK server 506 may be implemented at the middleware location based on the IP Re-Routing model. In step 708, a configuration file may be created for the list of analytics API calls and the parameters.

In step 710, a local web server with an API names forwarding web server template (AFWST) replicated configuration file may be built. In step 712, the local web server may be hosted on a client side. In step 714, a web server IP address may be sent to the developers 502A-D. In step 716, the AFWST may be integrated with a local storage unit. In step 718, the AFWST may be integrated with a data expiry unit. In step 720, the AFWST may be integrated with a dashboard and reporting module. In step 722, the AFWST may be integrated with an analytics rules execution unit (AREU). In step 724, the AFWST may be integrated with an analytics rules file and a user interface to obtain the analytics results using the SDK server 506 implemented at the middleware location.

Figure 8:
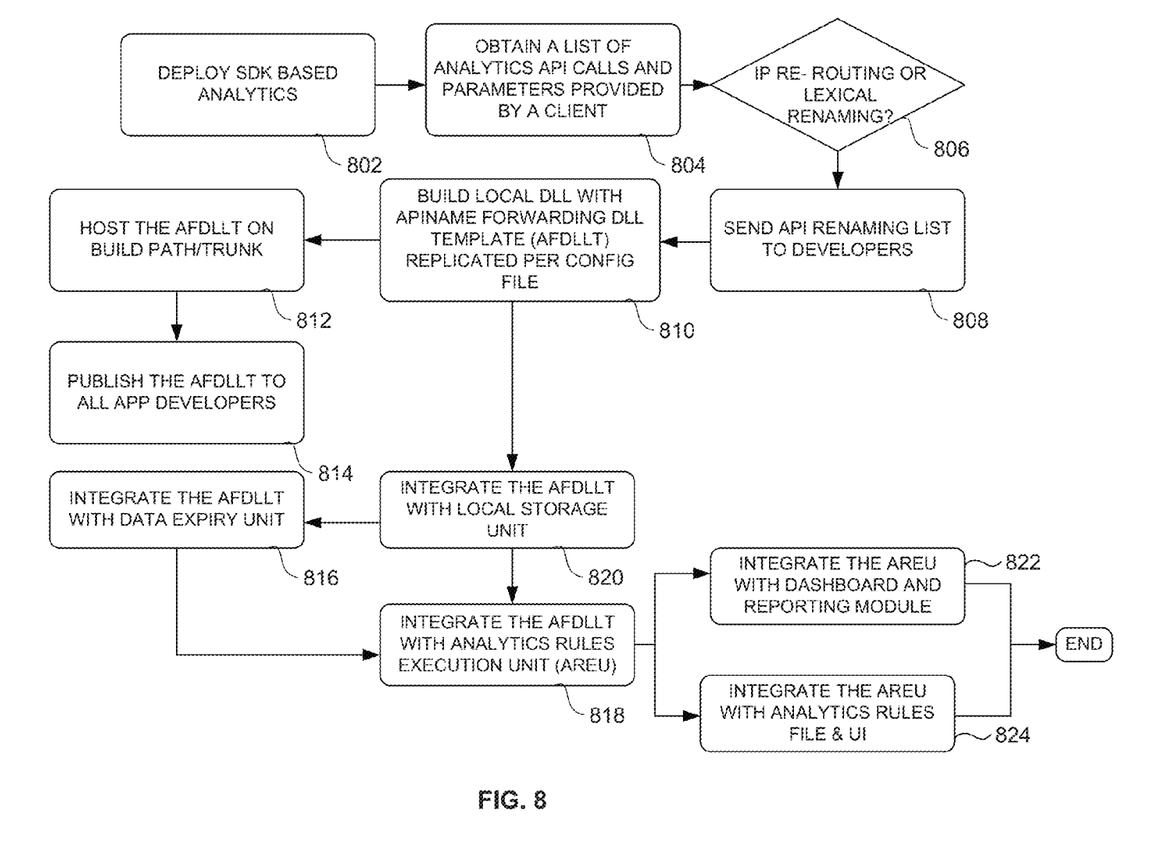
FIG. 8 is a flow diagram that illustrates a method for obtaining analytics results using the SDK server according to some embodiments of the present disclosure.

FIG. 8 is a flow diagram that illustrates a method for obtaining analytics results using the SDK server 506 of the analytics system 500 implemented at a middleware application based on a lexical Re-Routing model according to one embodiment of the present disclosure. In step 802, an SDK based analytics may be deployed. In step 804, a list of analytics API calls and parameters may be obtained from a client for analytics information. In step 806, the SDK server 506 may be implemented at the middleware location based on the lexical Re-Routing model. The list of analytics API calls may be lexically renamed to a minor variant library to obtain an API renaming list.

In step 808, the API renaming list may be sent to the developers 502A-D. In step 810, a local DLL with an API names forwarding DLL template (AFDLLT) replicated per configuration file, may be built. In step 812, the AFDLLT may be hosted on a build path or a trunk. In step 814, the AFDLLT may be distributed among the developers 502A-D. In step 816, the AFDLLT may be integrated with a data expiry unit. In step 818, the AFDLLT may be integrated with an analytics rules execution unit (AREU). In step 820, the AFDLLT may be integrated with a local storage unit. In step 822, the AREU may be integrated with a dashboard and reporting module. In step 824, the AREU may be integrated with analytics rules files and a user interface to obtain the analytics rules using the SDK server 506 implemented at the middleware location.

Figure 9:
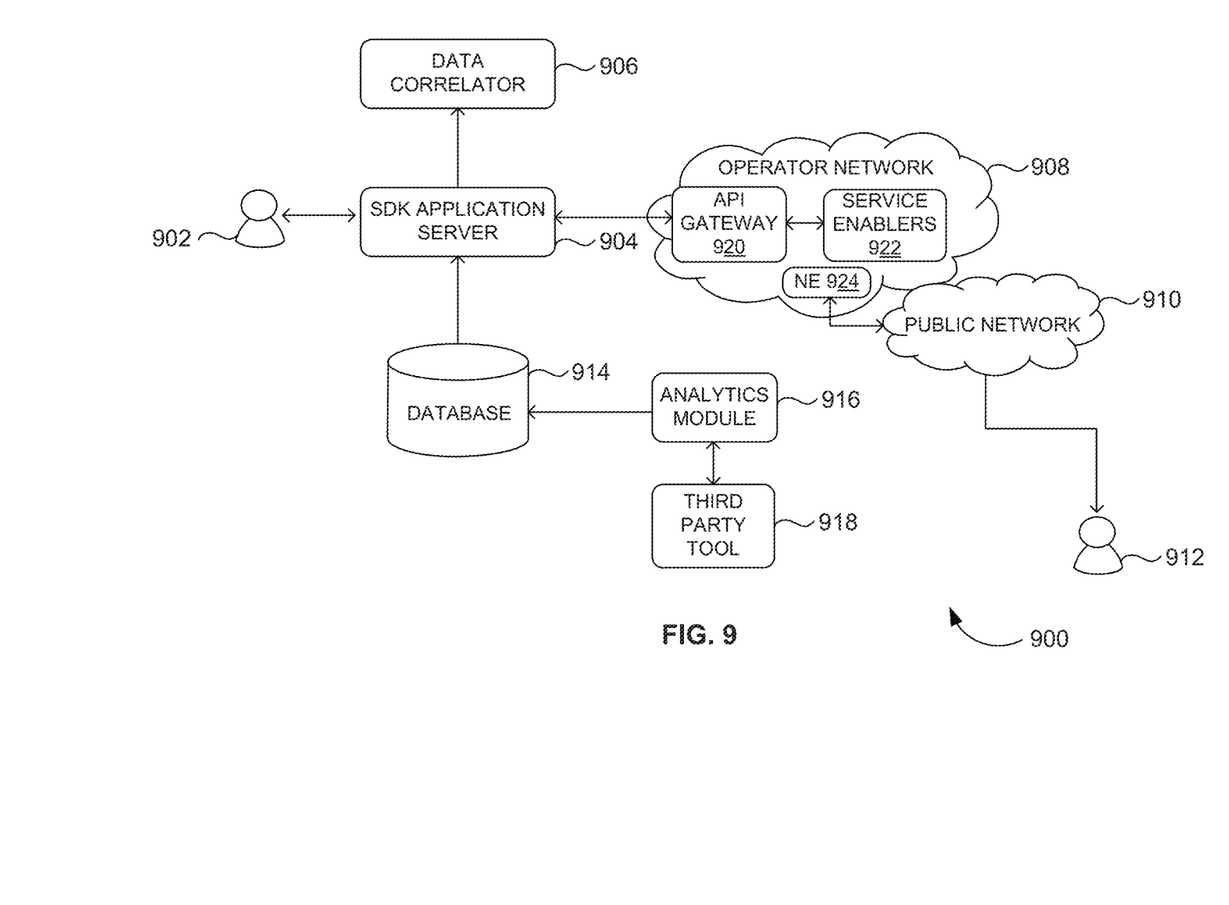
FIG. 9 is a block diagram showing an SDK application server according to some embodiments of the present disclosure.

FIG. 9 is a block diagram showing an SDK application server 904 for a telecommunication operator according to one embodiment of the present disclosure. The system view 900 may include a first user 902, the SDK application server 904, a data correlator 906, an operator network 908, a public network 910, a second user 912, a database 914, an analytics module 916, and a third party tool 918. The operator network 908 further may include an API gateway 920, service enablers 922, and network elements 924. The first user 902 may execute analytics queries which may be implemented at the SDK application server 904. The SDK application server 904 may be a local application server in which API calls corresponding to the analytics queries may be parsed and partitioned into API call parameters that may be related to analytics, and an API call name that is unrelated to analytics.

The SDK application server 904 may be a Dynamic-Link Library (DLL) in which API calls corresponding to the analytics queries may be lexically renamed to a minor variant library name and executed at the DLL. The second user 912 communicates with the SDK application server 904 through the operator network 908 and the public network 910. The third-party tool 918 may perform analytics on the API call name that is unrelated to analytics using the analytics module 916, and interpretation of the analytics may be stored in the database 914. Analytics results stored in the database 914 may be communicated to the SDK application server 904.

Additional features, methods, and systems are contemplated. As an example, the location of the analytics execution server, in the network topology, upon consideration of the data flow amongst the interconnected components may be optimized. This may bring in the benefits of data volume reduction, a key value add for high-volume data processing applications and analytics. Each data item, used in the analytics queries, may be attributed a "birth-site" and a "death-site," indicating where the data was first created and likewise where the data was parked and expired. The particular data item may flow between the birth-site and the death-site along a designated network path. If the analytics operation involves n data items, then it may become an optimization problem to select a specific node where the largest volume of the data sets are naturally present, and the smallest amount of data sets may require to be transported. This optimization may render opportunities and benefits, for example, in network traffic reduction, reduction of the analytics query execution CPU workload, and the server performance.

As another example, the disclosure of "imprecise visualization" (e.g., where the data may be precise but the interpretation may be subjective) can be combined with imprecise queries as well. Imprecise queries, while different from imprecise visualization, can be implemented together with imprecise visualization, offering the combined benefits of: (1) use of ambiguous data and (2) use of ambiguous queries.

As another example, the disclosure contemplates providing an analytics solution to a dashboard, as a forward path of information flow (e.g., from query and acting upon the data to producing the analytics output). A reverse path may also be possible in some embodiments, where the analytics output (a/k/a a dashboard) may receive user feedback, for example, via a textbox and/or with graphical aid to create new queries and iteratively generate new analytics. Combination(s) of the forward and reverse paths may provide a more powerful analytics solution and reduced cycle time to visualize or browse through a large number of what-IF solutions.

As another example, each data item may be treated at a specific and single precision level. As an example, if a data item is a quarterly profit amount, stated in $M units, then the analytics output may, in some embodiments, always preserve the same granularity unit. However, this capability can be extended to change the data unit to $K or $B or $10M—depending upon the scale of the output and the unit values of the adjoining data items. Thus, multiple data items may be combined, each with its respective unit value, and the resulting solution may produce an analytics output that reverts to a single unit value. Benefits of such a scheme may include, for example, enhanced user perception and visualization.

Computer System

Figure 10:
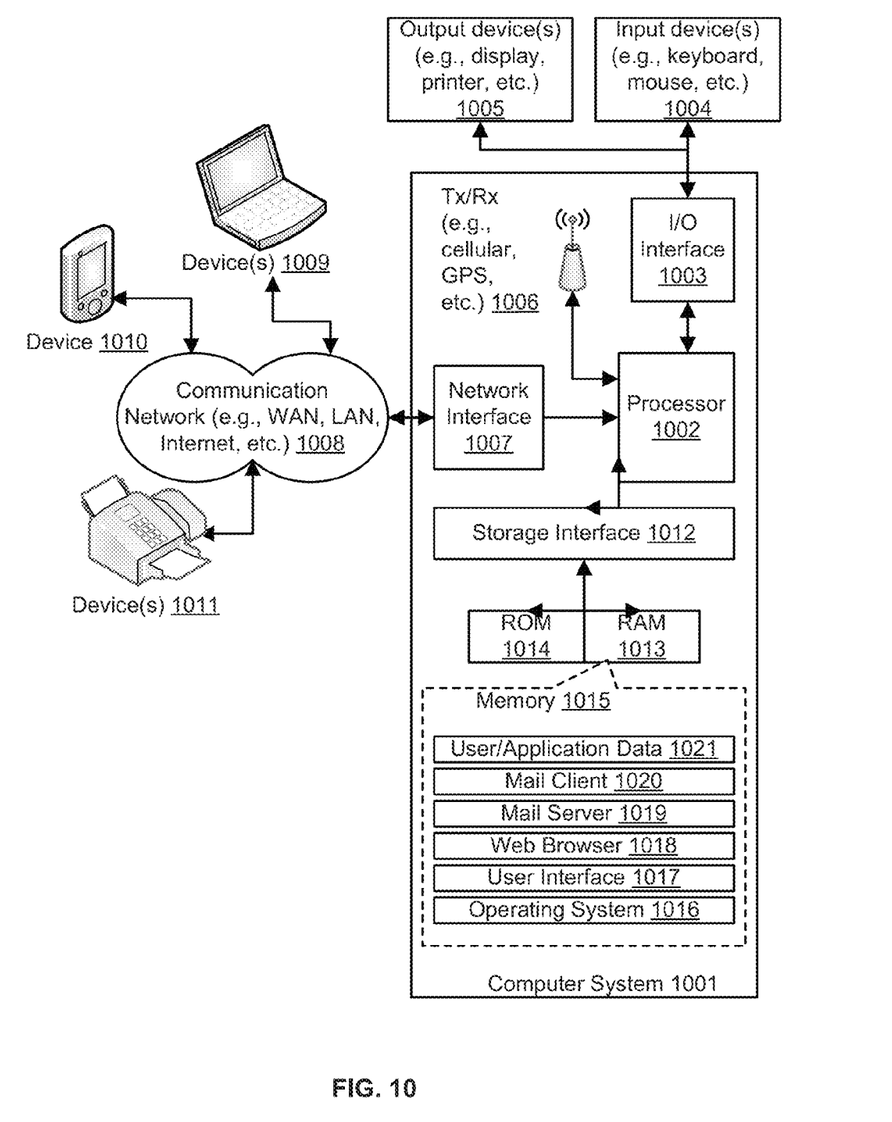
FIG. 10 is a block diagram of an exemplary computer system for implementing embodiments consistent with the present disclosure.

FIG. 10 is a block diagram of an exemplary computer system for implementing embodiments consistent with the present disclosure. Variations of computer system 1001 may be used for implementing any of the computing devices, system etc. utilized in this disclosure. Computer system 1001 may comprise a central processing unit ("CPU" or "processor") 1002. Processor 1002 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1002 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1002 may be disposed in communication with one or more input/output (I/O) devices via I/O interface 1003. The I/O interface 1003 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1003, the computer system 1001 may communicate with one or more I/O devices. For example, the input device 1004 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1005 may be a printer, fax machine, video display (e.g., cathode ray tube (CRT), liquid crystal display (LCD), light-emitting diode (LED), plasma, or the like), audio speaker, etc. In some embodiments, a transceiver 1006 may be disposed in connection with the processor 1002. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1002 may be disposed in communication with a communication network 1008 via a network interface 1007. The network interface 1007 may communicate with the communication network 1008. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1008 may include, without limitation, a direct interconnection, local area network (LAN), wide area network (WAN), wireless network (e.g., using Wireless Application Protocol), the Internet, etc. Using the network interface 1007 and the communication network 1008, the computer system 1001 may communicate with devices 1010, 1011, and 1012. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1001 may itself embody one or more of these devices.

In some embodiments, the processor 1002 may be disposed in communication with one or more memory devices (e.g., RAM 1013, ROM 1014, etc.) via a storage interface 1012. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1016, user interface application 1017, web browser 1018, mail server 1019, mail client 1020, user/application data 1021 (e.g., any data variables or data records discussed in this disclosure), etc. The operating system 1016 may facilitate resource management and operation of the computer system 1001. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1017 may facilitate display, execution, interaction, manipulation, or operation of program components through textual or graphical facilities. For example, user interfaces may provide computer interaction interface elements on a display system operatively connected to the computer system 1001, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1001 may implement a web browser 1018 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1001 may implement a mail server 1019 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1001 may implement a mail client 1020 stored program component. The mail client may be a mail viewing application, such as Apple Mail, Microsoft Entourage, Microsoft Outlook, Mozilla Thunderbird, etc.

In some embodiments, computer system 1001 may store user/application data 1021, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for improved security and precision in executing analytics using SDKs. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the claims that follow.

What is claimed is:

1. An analytics system, comprising:
a processor; and
a memory device operatively connected to the processor and storing processor-executable instructions for:
receiving an application programming interface (API) call for a service, the API call associated with an analytics query;
parsing the API call to extract an API call name and one or more API call parameters;
identifying a context associated with executing the analytics query based on one or more keywords in the analytics query;
obtaining one or more interpreted-data parameters based on the identified context;
generating prediction values for the one or more interpreted-data parameters, wherein the prediction values include percentage values assigned to each of the one or more interpreted-data parameters;
obtaining one or more analytics rules;
performing an analytics operation to generate an analytics result according to the one or more analytics rules based on the generated prediction values for the one or more interpreted-data parameters and the extracted one or more API call parameters; and
generating a visual representation of the analytics result.

2. The system of claim 1, the memory device further storing instructions for:
obtaining a user input requesting a new iteration of prediction values for the one or more interpreted-data parameters; and
wherein generating prediction values for the one or more interpreted-data parameters may include updating previously generated values for the one or more interpreted-data parameters.

3. The system of claim 2, wherein the generated prediction values for the one or more interpreted-data parameters are selected from a plurality of predetermined values, the selected one or more interpreted-data parameters being independent of each other.

4. The system of claim 3, wherein the one or more interpreted-data parameters are selected via user input.

5. The system of claim 4, wherein the user input is obtained based on a determination that user input is required for generating prediction values for one or more interpreted-data parameters rather than programmatic selection of the prediction values.

6. The system of claim 3, wherein the generated prediction values for a subset of the one or more interpreted-data parameters are utilized to generate the prediction values for another subset of the one or more interpreted-data parameters.

7. The system of claim 1, wherein the service is a web application service.

8. The system of claim 1, wherein one or more of the analytics rules are obtained from a secure database configured to be accessible to an operator of the analytics system but inaccessible to: a user device providing the API call; a developer of an application executing on the user device providing the API call; and a service provider of the service.

9. The system of claim 1, wherein identifications of one or more of the analytics rules are included in the API call.

10. The system of claim 1, the memory device further storing instructions for:
generating at least one of a new API call name or a new API call address based on the extracted API call name or the one or more API call parameters;
generating a new API call for the service using the generated at least one of the new API call name or the new API call address; and
providing the generated new API call for the service.

11. The system of claim 10, wherein the new API call name is generated by extracting a string subset of the API call name.

12. The system of claim 11, wherein an API call address for the generated new API call is the same as an API call address for the received API call for the service.

13. The system of claim 10, wherein the new API call address is generated by providing the API call name as input to a lookup table.

14. The system of claim 13, wherein an API call name for the generated new API call is the same as the API call name.

15. An analytics method, comprising:
receiving an application programming interface (API) call for a service, the API call associated with an analytics query;
parsing the API call to extract an API call name and one or more API call parameters;
identifying a context associated with executing the analytics query based on one or more keywords in the analytics query;
obtaining one or more interpreted-data parameters based on the identified context;
generating, via at least one processor, prediction values for the one or more interpreted-data parameters, wherein the prediction values include percentage values assigned to each of the one or more interpreted-data parameters;
obtaining one or more analytics rules;
performing an analytics operation, via the at least one processor, to generate an analytics result according to the one or more analytics rules based on the generated prediction values for the one or more interpreted-data parameters and the extracted one or more API call parameters; and
generating a visual representation of the analytics result.

16. The method of claim 15, further comprising:
obtaining a user input requesting a new iteration of prediction values for the one or more interpreted-data parameters; and
wherein generating prediction values for the one or more interpreted-data parameters may include updating previously generated values for the one or more interpreted-data parameters.

17. The method of claim 16, wherein the generated prediction values for the one or more interpreted-data parameters are selected from a plurality of predetermined values, with the one or more interpreted-data parameters being independent of each other.

18. The method of claim 17, wherein the one or more interpreted-data parameters are selected via user input.

19. The method of claim 18, wherein the user input is obtained based on a determination that user input is required for generating prediction values for one or more interpreted-data parameters rather than programmatic selection of the prediction values.

20. The method of claim 17, wherein the generated prediction values for a subset of the one or more interpreted-data parameters are utilized to generate the prediction values for another subset of the one or more interpreted-data parameters.

21. The method of claim 15, wherein the service is a web application service.

22. The method of claim 15, wherein one or more of the analytics rules are obtained from a secure database configured to be accessible to an operator of the analytics system but inaccessible to: a user device providing the API call; a developer of an application executing on the user device providing the API call; and a service provider of the service.

23. The method of claim 15, wherein identifications of one or more of the analytics rules are included in the API call.

24. The method of claim 15, further comprising:
generating at least one of a new API call name or a new API call address based on the extracted the API call name or the one or more API call parameters;
generating a new API call for the service using the generated at least one of the new API call name or the new API call address; and
providing the generated new API call for the service.

25. The method of claim 24, wherein the new API call name is generated by extracting a string subset of the API call name.

26. The method of claim 25, wherein an API call address for the generated new API call is the same as an API call address for the received API call for the service.

27. The method of claim 24, wherein the new API call address is generated by providing the API call name as input to a lookup table.

28. The method of claim 27, wherein an API call name for the generated new API call is the same as the API call name.

29. A non-transitory computer-readable medium storing computer-executable analytics instructions that, when executed by one or more processors, causes the one or more processors to perform operations comprising:
receiving an application programming interface (API) call for a service, the API call associated with an analytics query;
parsing the API call to extract an API call name and one or more API call parameters;
identifying a context associated with executing the analytics query based on one or more keywords in the analytics query;
obtaining one or more interpreted-data parameters based on the identified context;
generating prediction values for the one or more interpreted-data parameters, wherein the prediction values include percentage values assigned to each of the one or more interpreted-data parameters;
obtaining one or more analytics rules;
performing an analytics operation to generate an analytics result according to the one or more analytics rules based on the generated prediction values for the one or more interpreted-data parameters and the extracted one or more API call parameters; and
generating a visual representation of the analytics result.

30. The medium of claim 29, further storing instructions for:
obtaining a user input requesting a new iteration of prediction values for the one or more interpreted-data parameters; and
wherein generating prediction values for the one or more interpreted-data parameters may include updating previously generated values for the one or more interpreted-data parameters.

31. The medium of claim 30, wherein the generated prediction values for the one or more interpreted-data parameters are selected from a plurality of predetermined values, the one or more selected interpreted-data parameters being independent of each other.

32. The medium of claim 31, wherein the one or more interpreted-data parameters are selected via user input.

33. The medium of claim 32, wherein the user input is obtained based on a determination that user input is required for generating prediction values for one or more interpreted-data parameters rather than programmatic selection of the prediction values.

34. The medium of claim 31, wherein the generated prediction values for a subset of the one or more interpreted-data parameters are utilized to generate the prediction values for another subset of the one or more interpreted-data parameters.

35. The medium of claim 29, wherein the service is a web application service.

36. The medium of claim 29, wherein one or more of the analytics rules are obtained from a secure database configured to be accessible to an operator of the analytics system but inaccessible to: a user device providing the API call; a developer of an application executing on the user device providing the API call; and a service provider of the service.

37. The medium of claim 29, wherein identifications of one or more of the analytics rules are included in the API call.

38. The medium of claim 29, further storing instructions for:
generating at least one of a new API call name or a new API call address based on the extracted the API call name or the one or more API call parameters;
generating a new API call for the service using the generated at least one of: the new API call name; or the new API call address; and
providing the generated new API call for the service.

39. The medium of claim 38, wherein the new API call name is generated, by extracting a string subset of the API call name.

40. The medium of claim 39, wherein an API call address for the generated new API call is the same as an API call address for the received API call for the service.

41. The medium of claim 38, wherein the new API call address is generated by providing the API call name as input to a lookup table.

42. The medium of claim 41, wherein an API call name for the generated new API call is the same as the API call name.

* * * * *